(12) United States Patent
Justus et al.

(10) Patent No.: US 9,254,950 B2
(45) Date of Patent: Feb. 9, 2016

(54) DEVICE FOR ENCAPSULATING FLAVORING SOLIDS AND CONTAINER HAVING SUCH A DEVICE

(75) Inventors: Christian Justus, Hamburg (DE); Sebastian Mends-Cole, Hamburg (DE); Eric Pfromm, Hamburg (DE)

(73) Assignee: RIENSCH & HELD GMBH & CO., Hamburg (DE)

( * ) Notice: Subject to any disclaimer, the term of this patent is extended or adjusted under 35 U.S.C. 154(b) by 474 days.

(21) Appl. No.: 13/700,862

(22) PCT Filed: Jun. 11, 2010

(86) PCT No.: PCT/EP2010/058224
§ 371 (c)(1),
(2), (4) Date: Feb. 26, 2013

(87) PCT Pub. No.: WO2011/150980
PCT Pub. Date: Dec. 8, 2011

(65) Prior Publication Data
US 2013/0146486 A1    Jun. 13, 2013

(30) Foreign Application Priority Data
May 31, 2010 (DE) ...................... 20 2010 007 395 U (51) Int. Cl.
*A47J 31/18* (2006.01)
*B65D 81/32* (2006.01)
*A47J 31/06* (2006.01)
(Continued)

(52) U.S. Cl.
CPC ............ *B65D 81/32* (2013.01); *A47J 31/0615* (2013.01); *A47J 31/005* (2013.01); *A47J 31/057* (2013.01); *A47J 31/20* (2013.01); *A47J 43/044* (2013.01); *A47J 43/1031* (2013.01)

(58) Field of Classification Search
CPC ...... A47J 31/0615; A47J 31/20; A47J 31/005; A47J 31/057; A47J 43/044; A47J 43/1031
USPC ....................... 366/276, 243, 247, 130; 99/297
See application file for complete search history.

(56) References Cited

U.S. PATENT DOCUMENTS 6,272,974 B1 *   8/2001   Pascotti et al. .................. 99/318
6,318,244 B1 *  11/2001   Justus ............................. 99/323

FOREIGN PATENT DOCUMENTS

DE        19637899       1/1998
EP         1029484       8/2000

OTHER PUBLICATIONS

Feb. 7, 2011, International Search Report and Written Opinion dated Feb. 7, 2011 from PCT Application No. PCT/EP2010/058224, 9 pages.

*Primary Examiner* — Tony G Soohoo
(74) *Attorney, Agent, or Firm* — Hollingsworth Davis, LLC (57) ABSTRACT

A device is described to encapsulate solid flavoring substances, particularly tea or coffee, added to a liquid, particularly water, with a wing-shaped rotary slider supported rotational about a rotary axis between an initial position and an end position, which in its end position limits a space accepting the solid flavoring substances, with the device being embodied for the installation in a container with its top showing an opening to fill in or discharge the liquid, which can be closed by a lid, which for closing and opening the container opening is subjected to a rotary motion, characterized in that the rotary slider comprises at least one engagement means by which the rotary slider can be made to engage the lid at least during the rotary motion in order to close the container opening and can be rotated into its end position.

26 Claims, 6 Drawing Sheets (51) Int. Cl.
*A47J 43/044* (2006.01)
*A47J 31/057* (2006.01)
*A47J 31/20* (2006.01)
*A47J 31/00* (2006.01)
*A47J 43/10* (2006.01)

DEVICE FOR ENCAPSULATING FLAVORING SOLIDS AND CONTAINER HAVING SUCH A DEVICE

The invention relates to a device for encapsulating solid flavoring substances, particularly tea or coffee, dissolved in a liquid, particular water, with a wing-shaped rotary slider supported rotational about a rotary axis between an initial position and an end position, which in its end position limits a space accepting the solid flavoring substances, with the device being embodied for the installation in a container, with its top showing with an opening for filling in or releasing the liquid, which can be closed by a lid, which is subject to a rotary motion for opening and closing the container opening, as well as further a container, particularly a drinking cup, with a preferably cup-shaped container housing, which is limited by a wall and a bottom, and which comprises a container opening at the top opposite the bottom for filling in and releasing a liquid comprising solid flavoring substances, particularly tea or coffee, and with a lid for closing the container openings, with the lid being embodied such that for closing and opening the container opening it is subjected to a rotary motion, showing such a device.

Such a device, for example known from EP 1 029 474 A1, allows a targeted termination of the brewing process of the solid flavoring substances by the user interfering, with here the user rotating the rotary slider from its original position into its end position. For this purpose, first the solid flavoring substances, for example tea, are added to the liquid so that it comes into contact with the preferably preheated liquid and accordingly releases flavoring substances thereto. Here the rotary slider is in its initial position. After the brewing period has expired the rotary slider is subjected to a rotary motion, by which it is moved from an initial position into an end position and here entrains the flavoring substances into a space limited by the rotary slider in its end position. When the entirety of the solid flavoring substances has been brought into said space by a rotation of the rotary slider it has no longer any contact with the surrounding liquid so that here the brewing process of the solid flavoring substances in the liquid is ended in a targeted fashion. Due to the fact that the rotary slider in its end position limits the space now comprising the flavoring substances, these flavoring substances are now encapsulated and separated from the remaining liquid. This way it is prevented that the flavoring substances can leave said space in an undesired fashion and once more come into contact with the surrounding liquid. This way, even after the end of the brewing process it is not necessary to immediately remove the solid flavoring substances from the liquid.

Even if the above-mentioned device has proven in practice, there is a need for a further simplification of its operation.

This objective is attained according to a first aspect in a device for encapsulating solid flavoring substances, particularly tea or coffee, added to a liquid, particularly water, with a wing-shaped rotary slider supported rotational about a rotary axis between an initial position and an end position, which in its end position limits a space accepting the solid flavoring substances, with the device being embodied for the installation in a container, with its top comprising an opening to fill in or discharge the liquid, which can be closed by a lid, with the lid being subjected to a rotary motion for closing and opening the container opening.

Further this objective is attained in a second aspect of the invention in a container, particularly a drinking cup, with a preferably cup-shaped container housing, which is limited by a wall and bottom and with its top opposite the bottom comprises a container opening to fill in or discharge liquid comprising solid flavoring substances, particularly tea or coffee, and with a lid for closing the container opening, with the lid being embodied such that for closing and opening the container opening it is subjected to a rotary motion, characterized in a device according to the first aspect of the invention. According to the invention the rotary motion of the lid of a container is used in its closed position also to pivot the rotary slider into its end position in order to encapsulate the solid flavoring substances in the space limited by the rotary slider in its end position. The rotary motion of the lid is therefore transferred to the rotary slider. This is achieved according to the invention such that via an engagement means the rotary slider can be brought to engage the lid at least during its rotary motion for closing the container opening and thus can be rotated into its end position. The advantage of the invention therefore comprises that for bringing the rotary slider into its end position, on the one hand, and for the closing motion of the lid, on the other hand, no separate handling is required but jointly a single rotary motion is sufficient, by a respective torque being applied upon the lid. Using a single handling measure here according to the invention both the lid can be brought into its closed position as well as the rotary slider can be brought into its end position for encapsulating the solid flavoring substances.

Preferred embodiments and further developments of the invention are disclosed in the dependent claims.

Figure 1:
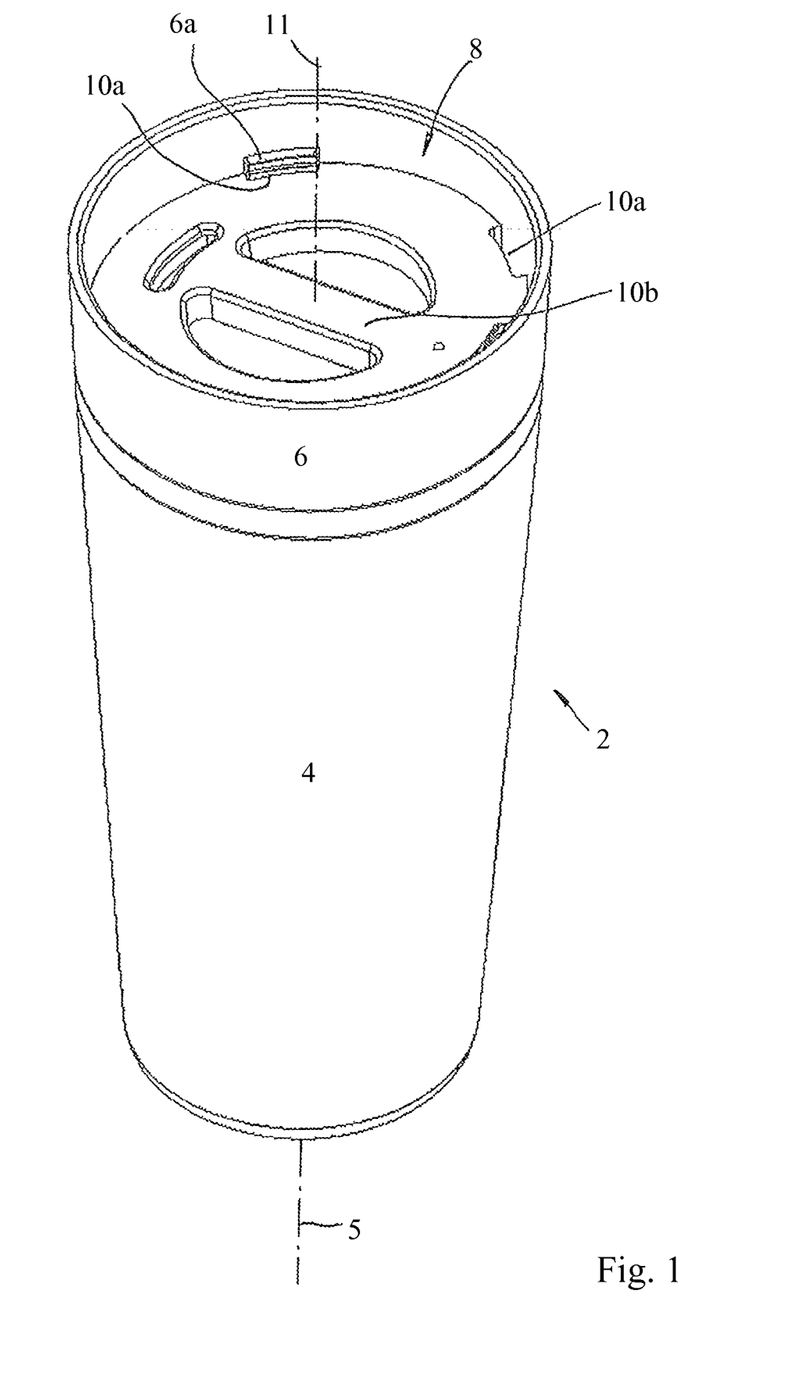
FIG. 1 a drinking cup closed by a lid according to a preferred exemplary embodiment, in a perspective view.
Figure 2:
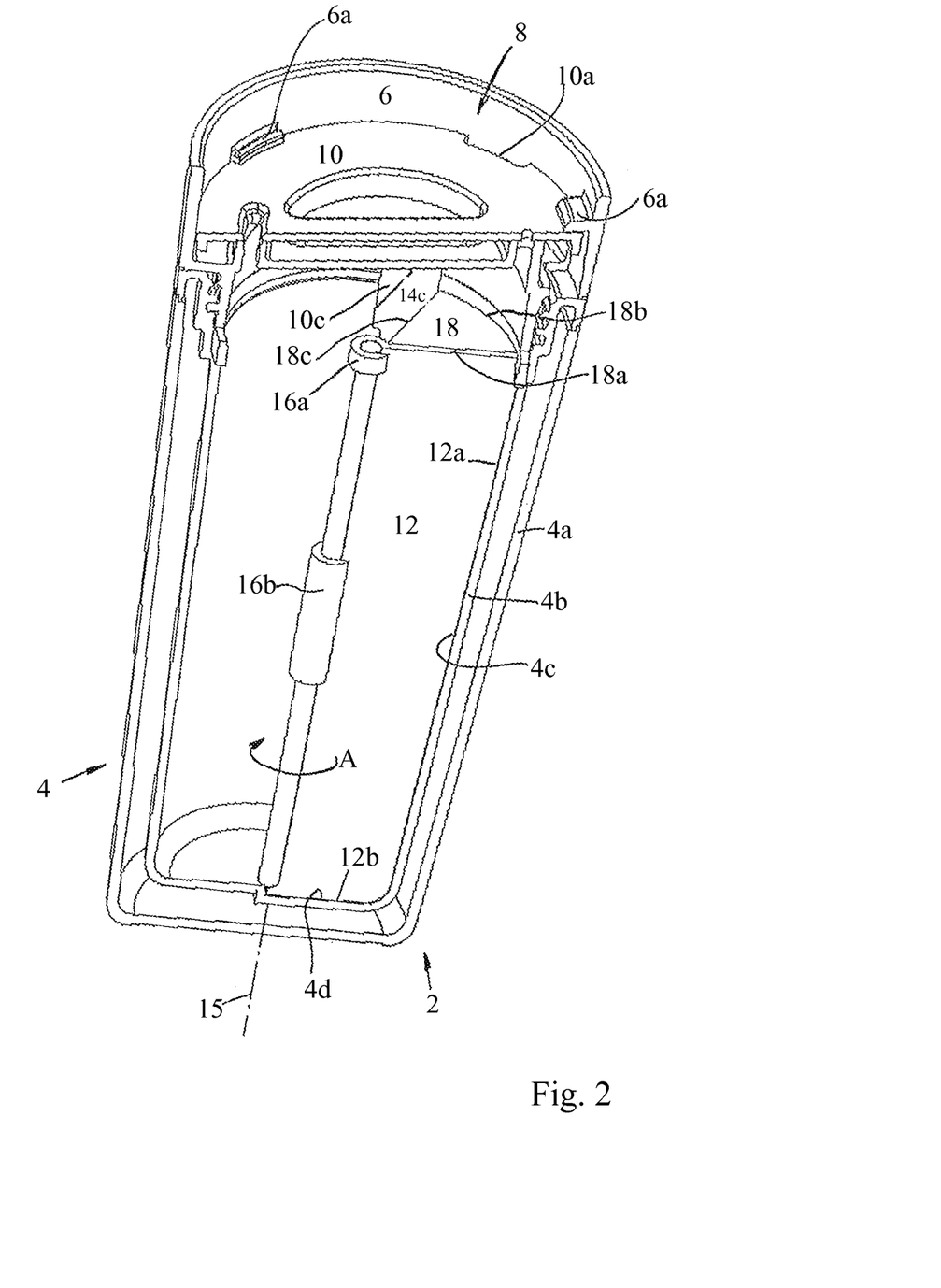
FIG. 2 in a similar perspective view as FIG. 1, the drinking cup in a longitudinal cross-section with a rotary mechanism inserted therein for encapsulating solid flavoring substances according to a preferred embodiment of the invention.

In the following, a preferred exemplary embodiment of the invention is explained in greater detail based on the attached drawings. It shows:

FIG. 1 shows a drinking cup 2 in a perspective view, while in FIG. 2 the drinking cup 2 is shown in a longitudinal cross-section with a rotary mechanism discernible, inserted to encapsulate solid flavoring substances. The rotary mechanism is explained in detail at a later section of the description.

The drinking cup 2 comprises a cup-shaped housing and/or a cup-shaped hollow body 4, which is limited by a lateral wall and is closed at its base by a bottom. A ring 6 is arranged at the top of the cup-shaped hollow body 4 opposite the bottom, which limits an opening 8. The opening 8 serves for filling in liquids into a drinking cup 2 and for discharging liquids from the drinking cup 2 and thus it is also called the container opening 8. The hollow body 4 and the ring 6 placed thereupon are embodied rotary symmetrical and thus form a rotary body with its rotary and/or central axis being shown in dot-dash lines in FIG. 1 and marked with the reference character "5".

Accordingly, both the hollow body 4 and the ring 6 show an annular cross-section.

The drinking cup opening 8 embodied at the top of the drinking cup 2 and limited by the ring 6 can be closed with a lid 10. FIGS. 1 and 2 show the lid 10 in its closed position in which it closes the drinking cut opening 8. The lid 10 also shows an essentially circular form, with its external diameter being slightly smaller than the clear diameter of the ring 6. For the purpose of opening and closing the lid 10 must be rotated about a rotary axis which extends through its center and which is show FIG. 1 as a dot-dash line and marked with the reference character "11". In the exemplary embodiment shown the rotary axis 11 of the lid 10 coincides with the rotary axis 5 of the hollow body 4. The opening and closing of the lid 10 occurs according to the principle of a bayonet closure. For this purpose, at defined positions projections 6a are formed at the inside of the ring 6 and respective recesses 10a at the circumference of the lid 10. In order to remove or insert the lid 10 the recesses 10a must be appropriately aligned to the projections 6a so that the projections 6a engage the recesses 10a. In order to close the lid 10 it is rotated about its rotary axis 11 causing the lid 10 to loosely engage with its perimeter under the projections 6a outside the recesses 10a. This way the lid 10 is locked at the ring 6 and thus at the drinking cup 2. The lid 10 is shown in this position in FIGS. 1 and 2. In order for the user rotating the lid 10 a diametric bar 10b is provided in the body of the lid 10, which serves as the handle.

As particularly discernible from FIG. 2, in the exemplary embodiment shown the cup-shaped hollow body 4 is embodied with a double wall and shows an external wall 4a, with an insert 4b being arranged in its inside, with its wall being distanced from the external wall 4a. This way, the insert 4b also forms a respective cup-shaped hollow body with an open top towards the drinking cup opening 8, with the insert 4b being fastened in a manner not described in greater detail at the external wall 4a of the hollow body 4. The insert 4b also represents a rotary body, arranged rotary symmetrically in reference to the external wall 4a so that its rotary axis is formed by the rotary axis 5 (FIG. 1).

Figure 3:
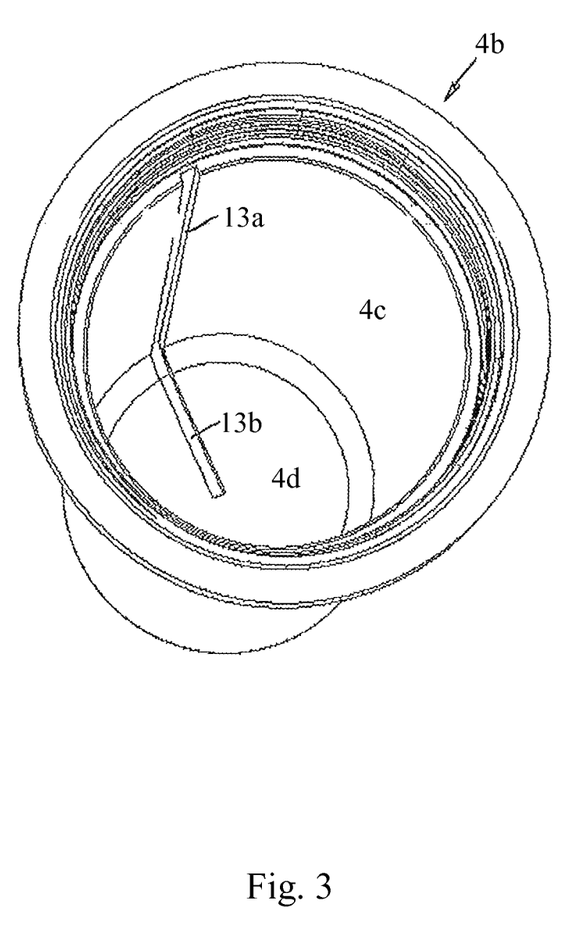
FIG. 3 a perspective top view of an insert to be inserted in a drinking cup.
Figure 4:
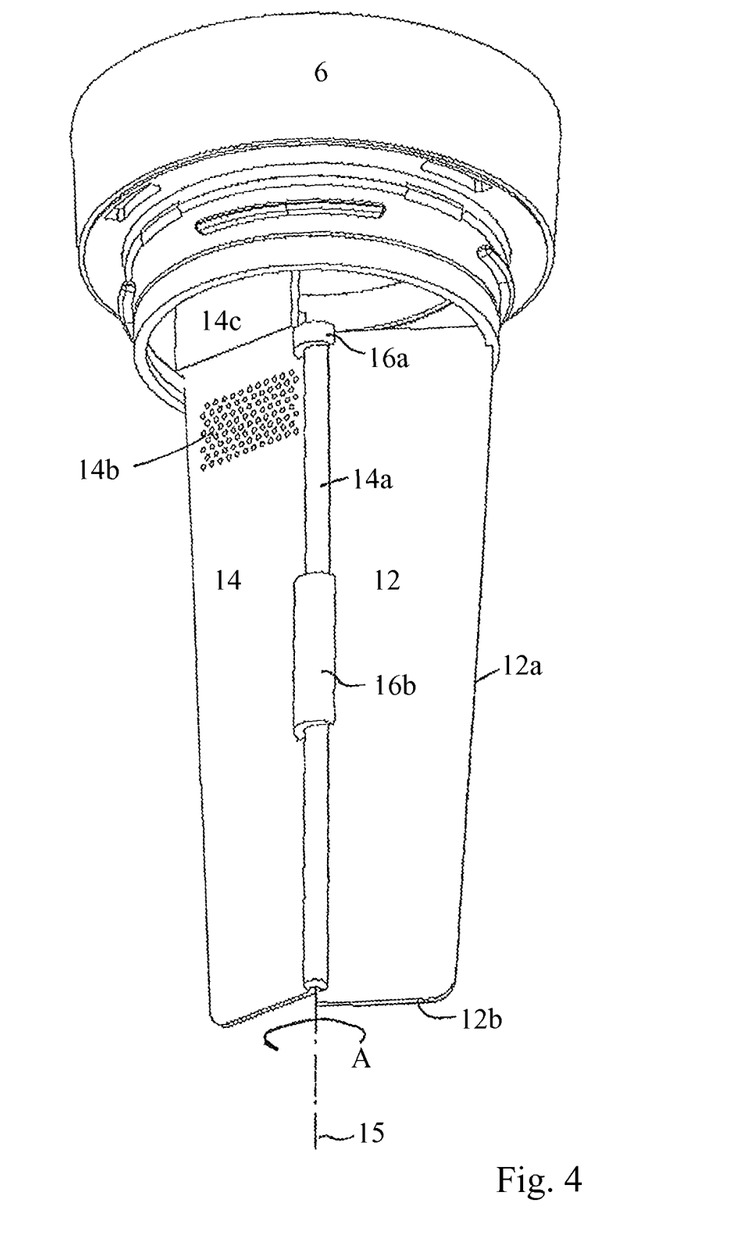
FIG. 4 an essentially lateral perspective view of the rotary mechanism according to a preferred embodiment of the invention.
Figure 5:
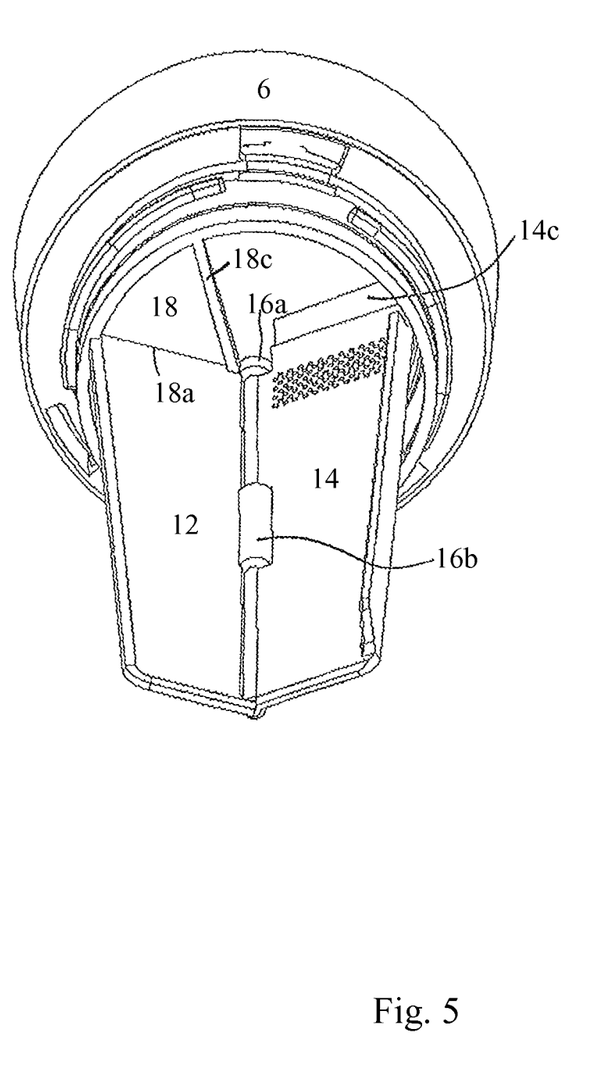
FIG. 5 a perspective view of the rotary mechanism of FIG. 4 essentially from the bottom.

As particularly discernible from FIG. 2 a fixed, plate-shaped wall element 12 is arranged inside the insert 4b and thus inside the hollow body 4, also called the so-called "sword". The fixed wall element 12 extends in the longitudinal direction as well as further radially from the central axis 5 (FIG. 1) to the interior side of the wall of the insert 4b and here seals with its adjacent edge 12a at the interior side 4c of the insert 4b as well as with its edge 12b at the bottom 4d of the insert 4b (preferably essentially in a sealing fashion). For a better fixation of the wall element 12 in reference to the insert 4b and thus in reference to the hollow body 4 of the drinking cup 2, a first groove 13a is formed at the inside 4c of the insert 4b, extending in the axial direction, with a second groove 13b following in the radial direction in the floor 4d of the insert 4b, as shown in FIG. 3. Here, the fixed wall element 12 with its exterior lateral edge 12a is inserted into the first groove 13a in the interior side 4c of the insert 4b and with its bottom edge 12b into the second groove 13b in the bottom 4d of the insert 4b, as discernible from the comparing analysis of FIGS. 2 and 3. As shown in FIGS. 4 and 5 the wall element 12 is fastened with its top at the ring 6.

Further, FIGS. 4 and 5 show that a rotary slider 14 is supported at the wall element 12 rotationally about a rotary axis 15. As further discernible from FIGS. 2 and 4 the rotary axis 15 extends along the internal lateral edge of the wall element 12. When installing the arrangement shown in FIG. 4 comprising the fixed wall element 12 and the rotary slider 14, rotational in reference thereto, in the inner insert 4b of the hollow body 4 of the drinking cup 2 (cf. FIG. 2) the rotary axis 15 of the rotary slider 14 essentially coincides with the rotary axis 5 of the hollow body 4 of the drinking cup 2 (FIG. 1).

The rotary slider 14, which alternatively can also be called a rotary sword or a rotary wing, comprises in the exemplary embodiment shown the form of a plate, similar to the fixed wail element 12, and also approximately the same relative dimensions and extends, similar to the wall element 12, radially from its rotary axis 15 and/or when installed in the drinking cup 2, from its rotary and/or central axis 5 radially towards the inside of the wall of the insert 4b. In order for the rotary slider 14 not losing its mobility, here contrary to the fixed wall element 12, no connection is provided between the external edge of the rotary slider 14 and the interior side 4c of the insert 4b, with the gap between the rotary slider 14 and the insert 4b being kept as small as possible.

For a rotational support of the rotary slider 14 about the rotary axis 15 hinge elements are provided at the wall element 12, which in the exemplary embodiment shown comprise sheath-shaped elements 16a, 16b according to FIGS. 4 and 5, which comprise the internal lateral edge 14a embodied as a rod and thus form a rotary support for this rod-shaped internal lateral edge 14a. As further discernible from FIGS. 2, 4, and 5 the hinge element 16a is located at the top and the hinge element 16b approximately in the center of the fixed wall element 12. However, it is also possible, instead thereof or additionally, to provide a hinge element in the installed state at the bottom adjacent to the base of the hollow body 4; in order to further increase the stiffness of the entire arrangement it should be considered in this context to provide this additional hinge with a projection protruding into a respective recess in the bottom 4d of the insert, by which an even better fixation of the entire arrangement can be achieved comprising the fixed wall element 12 and a rotary slider 14.

As further discernible in FIGS. 4 and 5 the rotary slider 14 is provided at its top with a perforated section 14b, which is liquid permeable, and prevent liquid slushing over the rotary slider 12 during its rotary motion.

Figure 6:
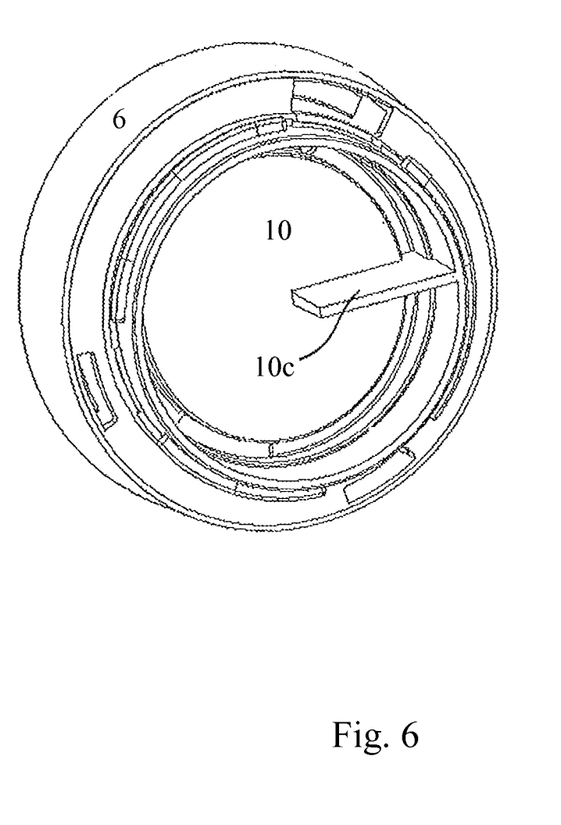
FIG. 6 a bottom view of the lid of the drinking cup.

Additionally, as particularly discernible from FIGS. 4 and 5, the rotary slider 14 is provided at its top with an essentially plate-shaped projection 14c, which projects upwards in the direction of the ring 6 and is located approximately in the level of the other sections of the rotary slider 14. This projection 14c serves to create a detachable, torque-proof coupling with the lid 10 when it is rotated about its rotary axis 11 (FIG. 1) into the closed positions shown in FIGS. 1 and 2. For this purpose, at the bottom of the lid 10 a respective radially aligned, plate-shaped projection 10c is formed, which is shown in FIG. 6 and during the rotary motion of the lid 10 comes to a planar contact with the projection 14c of the rotary slider 14 in order to accordingly transfer the rotary motion of the lid 10 to the rotary slider 14. This status is discernible in FIG. 2, in which the projection 10c of the lid 10 is shown in a planar contact with the projection 14c of the rotary slider 14. The projection 10c of the lid 10 therefore acts as an actuator, in order to entrain, after contacting the projection 14c, the rotary slider 14 into the closed position. Due to the fact that in the exemplary embodiments described the projection 10c of the lid 10 and the projection 14c of the rotary slider 14 only come into a loose planar contact during the rotary motion of the lid 10 into its closed position this leads that in an inverse rotary motion of the lid 10 into its open position its projection 10c easily separates from the projection 10c of the rotary slider 14.

Further, it is discernible from FIGS. 2 and 5 that a plate-shaped end element 18 is arranged at the top of the fixed wall element 12, which extends approximately perpendicular in reference to the wall element 12 and thus is positioned quasi horizontally. Here, in the exemplary embodiment shown the end element 18 is fastened with a radial lateral edge 18a at the upper edge of the wall element 12 and can also be connected thereto in one piece. This way, the end element 18 extends in the circumferential direction of the hollow body 4 away from the fixed wall element 12. The side of the wall element 12 facing to the observer of FIG. 2 forms the side ending in the end element 18 without projecting beyond it. The end element 18 shows the form of a slice of pie and/or a sector of a circle and ends with its exterior curved edge 18b at the inside 4c of the insert 4b (preferably essentially in a sealing fashion). As further discernible from FIGS. 2 and 5 the end element 18 shows another radial lateral edge 18c, which is arranged in an angular distance from the radial lateral edge 18a and is exposed.

As particularly discernible from FIGS. 4 and 5 the ring 6, the wall element 12 fastened thereat, and the rotary slider 14 linked to the wall element 12 form a structural unit, which is inserted through the drinking cup opening 8 into the hollow body 4 and, if necessary, can be removed therefrom and/or exchanged. FIG. 2 shows this structural unit, which forms a rotary mechanism for encapsulating solid flavoring substances to be explained in greater detail in the following, in a state completely inserted in the hollow body 4 of the drinking cup 2.

In the following the operation of the above-described arrangement is explained in greater detail. First, the drinking cup opening 8 must be open by the lid 10 being removed. Then through the opening of the drinking cup 8 a substance to be processed is filled into the hollow space of the insert 4b of the hollow body 4, which usually represents tea or ground coffee and thus represents a solid aromatic. In order to ensure that this substance is filled at the desired "correct" side of the wall element 12 and the rotary slider 14 and thus in the desired "correct" section of the hollow space of the insert 4b the rotary slider 14 should be pivoted back into an initial position to such an extent that it essentially abuts flat at the fixed wall element 12, namely at the side of the wall element 12 which points away from the closure element 18 and thus is not projecting beyond the connection element 18. This is the side of the wall element 12 facing the observer of FIGS. 2 and 4. Further, the hollow body 4 and/or its internal insert 4b is filled with water, preferably preheated. This filling with the above-mentioned substance and with the above-mentioned liquid may also occur in the inverse order.

Subsequently, preferably after a predetermined brewing period has expired, the rotary slider 14 is subjected to a rotary motion about its rotary axis 15 in the direction of the arrow A shown in FIGS. 2, 4, and 5 until it contacts the free radial lateral edge 18c of the closure element 18. Thus, this edge 18c of the closure element 18 serves as a stop for the rotary slider 14 and defines the end position of the rotary slider 14. The end position of the rotary slider 14 is only discernible based on the projection 14c projecting beyond the closure element 18. Due to the fact that in its end position the rotary slider 14 contacts the radial edge 18c of the closure element 18 the rotary slider 14 remains in its end position in an angular distance from the fixed wall element 12, which is approximately equivalent to the angular distance between the edges 18a and 18c of the closure element 18. This way, in the end position of the rotary slider 14 (in the Figs. not marked in greater detail) a space is formed, which is limited in the radial direction by the fixed wall element 18 on the one side and by the rotary slider 14 being in its end position on the other side and towards the base by the bottom 4d of the insert 4b of the hollow body 4 and towards the top by the end element 18. By the rotary motion of the rotary slider 14 in the direction of the arrow A, the substance included in the liquid is inserted into this space, thus the contact of the substance to the ambient liquid is interrupted and now no additional flavoring substances can be released from said substance into the liquid. In the end position of the rotary slider 14 the substance is essentially isolated from the ambient liquid because the substance is encapsulated in the above-mentioned space between the wall element 12 and the rotary slider 14 as well as the bottom 4d and the end element 18. Now the drinking cup 2 is prepared for the discharge of the aromatized liquid so that the lid 10 can be removed from the opening of the drinking cup 8. Due to the fact that during the rotary motion of the rotary slider 14 a displacement of the liquid occurs said liquid flows through the perforated section 14b of the rotary slider 14 in order to this way preventing any liquid slushing over the rotary slider 14.

In order to set the rotary slider 14 into the above-mentioned rotary motion in the direction of the arrow A for encapsulating the substance the lid 10 is used in the manner described above. When here the lid 10 is rotated about its rotary axis 11 (FIG. 1) into the closed position the projection 10c arranged at its bottom contacts the projection 14c of the rotary slider 14 and entrains the rotary slider 14 into its end position. Of course, the arrangement of the fixed wall element 12 and the rotary slider 14 on the one side and the arrangement of the lid 10 on the other side must be adjusted to each other such that any rotary motion of the lid 10 leads to the rotary slider 14 to be pivoted into its above-described end position. Additionally, the rotary motion of the lid 10 generated by the user must of course occur in the same direction according to the arrow A as the rotary motion of the rotary slider 10 such that the rotary slider 14 shows the same rotary direction as the lid 10.

In the above-described exemplary embodiment the space encapsulating the solid flavoring substances, which is limited by the fixed wall element 12 and the rotary slider 14 being in its end position, shows an essentially constant cross-section over its axial length. Alternatively it is also possible to embody the rotary slider and/or the fixed wall element such that the above-mentioned space tapers in the end position of the rotary slider in the direction towards the bottom 4d and, if applicable, the rotary slider in its end position and the fixed wall element 12 essentially contact in a section distanced from the opening of the drinking cup 8 to the floor 4d.

While in the above-descried exemplary embodiment a bayonet closure construction is used to optionally rotate the lid 10 into its closed position or into its open position, of course it is also possible alternatively to provide a threaded closure connection.

Finally it shall be mentioned that the above-described device, instead of the exemplary embodiment described, may be made entirely from plastic.

The invention claimed is:

1. A device for encapsulating solid flavoring substances, comprising:
a fixed element having an upper side and secured to a ring; and
a blade-like rotary slide comprising at least one engaging element, the rotary slide supported rotatably between an initial position and an end position at the fixed element, which rotary slide in its end position limits a space accepting the solid flavoring substances, wherein in the end position of the rotary slide, the space accepting the solid flavoring substances is delimited by the fixed element, the rotary slide, and an upper closing element,
wherein the ring, the fixed element, the upper closing element, and the rotary slide form a unit configured to be removably inserted through an opening of a container and into the container with the ring and the upper closing element arranged adjacent to the opening of the container and the engaging element is configured to contact a section of a lid of the container to rotate the rotary slide to the end position when the section is rotated to close the opening of the container.

2. A device according to claim 1, wherein the engaging element comprises a projection configured to be positioned inside of the container opening or through the container opening to engage the section of the lid.

3. A device according to claim 2, wherein the projection is configured to be in contacting abutment with the section of the lid when the device is inserted in the container.

4. A device according to claim 2, wherein the projection is plate-shaped.

5. A device according to claim 2, wherein the projection is pin-like.

6. A device according to claim 1, wherein the rotary slide is supported rotational at the fixed element via two hinges, wherein one of the hinges is arranged at one end of the fixed element and the other hinge is arranged either at a location between the ends of the fixed element or at an end of the fixed element opposing the one end.

7. A device according to claim 1, wherein the rotary slide is supported rotational at the fixed element via three hinges, wherein a first hinge is arranged at one end of the fixed element, a second hinge is arranged at an opposing end of the fixed element, and a third hinge is arranged at a location between the two ends of the fixed element.

8. A device according to claim 1, wherein a rotary axis of the rotary slide extends along an edge of the fixed element.

9. A device according to claim 1, wherein one or both of the rotary slide and the fixed element are configured to taper the space accepting the solid flavoring substances in the end position of the rotary slide in the direction away from the ring.

10. A device according to claim 9, wherein the rotary slide and the fixed element in the end position are configured to contact at a position distanced from the ring.

11. A device according to claim 1, wherein the fixed element is essentially plate-shaped.

12. A device according to claim 1, wherein the upper closing element, is plate-shaped and orthogonal to the fixed element.

13. A device according to claim 12, wherein the upper closing element is fastened at the fixed element, at an end proximate the ring.

14. A device according to claim 1, wherein the rotary slide comprises a section permeable to liquids.

15. A device according to claim 14, wherein the liquid-permeable section is adjacent an end of the rotary slide proximate the ring.

16. A device according to claim 14, wherein the liquid-permeable section is perforated.

17. A device according to claim 1, wherein the rotary slide is a planar plate-shaped element.

18. A system, comprising:
    a container comprising a cup-shaped housing having a wall, a bottom, and an opening opposite the bottom;
    a lid for covering the opening, wherein the lid is configured to close and open via a rotary motion; and
    a device comprising:
        a fixed element having an upper side and secured to a ring; and
        a blade-like rotary slide comprising at least one engaging element, the rotary slide supported rotatably between an initial position and an end position at the fixed element, which rotary slide in its end position limits a space accepting the solid flavoring substances, wherein in the end position of the rotary slide, the space accepting the solid flavoring substances is delimited by the fixed element, the rotary slide, and an upper closing element,
        wherein the ring, the fixed element, the upper closing element, and the rotary slide form a unit configured to be removably inserted through the opening of the container and into the container with the ring and the upper closing element arranged adjacent to the opening of the container and the engaging element is configured to contact a section of the lid of the container to rotate the rotary slide to the end position when the section is rotated to close the opening of the container.

19. A system according to claim 18, wherein the lid is rotational about a rotary axis of the lid, and when closing the container opening with the lid, the rotary axis of the lid essentially coincides with a rotary axis of the rotary slide.

20. A system according to claim 19, wherein the rotary slide is a wing extending radially from its rotary axis towards the inside of the wall of the housing.

21. A system according to claim 19, wherein the fixed element extends from the wall of the housing radially towards the rotary axis of the rotary slide.

22. A system according to claim 21, wherein the fixed element is arranged in the housing such that it ends with the inside of the wall and the bottom of the housing.

23. A system according to claim 22, wherein at the inside of the wall and in the bottom of the housing a groove-shaped recess accepts adjacent edge sections of the fixed element.

24. A system according to claim 18, wherein the housing is a rotary body, and a rotary axis of the rotary slide essentially coincides with a rotary axis of the housing.

25. A system according to claim 18, wherein the lid comprises a projection directed toward the housing, which is configured to make contacting engagement with the engagement element of the rotary slide.

26. A system according to claim 18, wherein in the bottom of the housing a recess is configured to accept adjacent sections of a hinge.

* * * * *